(12) United States Patent
Nakamizo et al.

(10) Patent No.: US 9,139,049 B2
(45) Date of Patent: Sep. 22, 2015

(54) TIRE

(75) Inventors: Akira Nakamizo, Higashiyamato (JP); Akiyoshi Shimizu, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 430 days.

(21) Appl. No.: 13/003,212

(22) PCT Filed: Jun. 29, 2009

(86) PCT No.: PCT/JP2009/061850
§ 371 (c)(1),
(2), (4) Date: Jan. 7, 2011

(87) PCT Pub. No.: WO2010/004898
PCT Pub. Date: Jan. 14, 2010

(65) Prior Publication Data
US 2011/0108176 A1 May 12, 2011

(30) Foreign Application Priority Data

Jul. 10, 2008 (JP) ................................ 2008-180330

(51) Int. Cl.
*B60C 11/12* (2006.01)
*B60C 11/13* (2006.01)
*B60C 11/03* (2006.01)

(52) U.S. Cl.
CPC ............. *B60C 11/13* (2013.01); *B60C 11/0306* (2013.04); *B60C 11/12* (2013.01); *B60C 11/125* (2013.04); *B60C 11/1218* (2013.04); *B60C 11/1263* (2013.04); *B60C 11/1281* (2013.04)

(58) Field of Classification Search
CPC ............ B60C 11/1263; B60C 11/1281; B60C 2011/1254
USPC .............. 152/209.18, 209.25, 209.27, DIG. 3
See application file for complete search history.

(56) References Cited

U.S. PATENT DOCUMENTS

| 2,121,955 | A | * | 6/1938 | Eger | 152/209.18 |
| 2,382,068 | A | * | 8/1945 | Kovacs | 157/13 |
| 2,821,231 | A | * | 1/1958 | Kraft | 152/209.22 |
| 2,926,715 | A | * | 3/1960 | Constantakis | 152/209.27 |

(Continued)

FOREIGN PATENT DOCUMENTS

| JP | 60-165231 | * | 8/1985 |
| JP | 02-267008 | * | 10/1990 |

(Continued)

OTHER PUBLICATIONS

English machine translation of Tsukagoshi (JP6-32115), dated Feb. 1994.*

(Continued)

*Primary Examiner* — Steven D Maki
*Assistant Examiner* — Robert Dye
(74) *Attorney, Agent, or Firm* — Sughrue Mion, PLLC

(57) ABSTRACT

An object the present invention is to provide a tire having a rib-like land portion and sipes provided therein, in which wear resistance has been enhanced by optimizing the shape of the sipes, while good fraction performance on a wet road surface is maintained. The tire has, in a tread portion, at least one row of rib-like land portion and sipes provided in the rib-like land portion. Further, depth of each sipe at least at one end portion thereof on the shoulder side is smaller than depth of the sipe at the remaining portions thereof.

9 Claims, 14 Drawing Sheets

(56) References Cited

U.S. PATENT DOCUMENTS

| | | | | |
|---|---|---|---|---|
| 4,320,790 A | * | 3/1982 | Corner et al. | 152/209.27 |
| 4,736,783 A | * | 4/1988 | Motomura et al. | 152/209.8 |
| 5,211,781 A | * | 5/1993 | Adam et al. | 152/209.25 |
| 5,591,280 A | * | 1/1997 | Asano | 152/209.22 |
| 6,000,450 A | | 12/1999 | Kishimoto et al. | |
| 6,003,575 A | * | 12/1999 | Koyama et al. | 152/209.18 |
| 6,123,130 A | * | 9/2000 | Himuro et al. | 152/209.3 |
| 6,715,522 B1 | * | 4/2004 | Wada | 152/209.18 |

FOREIGN PATENT DOCUMENTS

| | | | |
|---|---|---|---|
| JP | 03-136911 A | | 6/1991 |
| JP | 04-085107 | * | 3/1992 |
| JP | 06-032115 A | | 2/1994 |
| JP | 6032115 A | | 2/1994 |
| JP | 06-080002 A | | 3/1994 |
| JP | 09-136516 A | | 5/1997 |
| JP | 3226968 B2 | | 11/2001 |
| JP | 2004-224131 | * | 8/2004 |
| JP | 2005-193815 | * | 7/2005 |
| JP | 2008-120130 A | | 5/2008 |

OTHER PUBLICATIONS

English machine translation of JP2005-193815, dated Jul. 2005.*
English machine translation of JP2004-224131, dated Aug. 2004.*
Japanese Office Action issued in Application No. 2008-180330 dated Oct. 2, 2012, with an English language translation.
European Search Report issued in Application No. 09794344.3 dated Aug. 18, 2011.
International Search Report of PCT/JP2009/061850 dated Aug. 11, 2009.
Chinese Office Action issued in Chinese Application No. 200980134167.4 dated Oct. 30, 2012.
Chinese Office Action, dated Jun. 7, 2013, issued in corresponding Chinese Patent Application No. 200980134167.4.
Japanese Decision of Rejection issued in Application No. 2008-180330 dated Mar. 5, 2013.
Chinese Office Action, dated Nov. 15, 2013, issued in corresponding Chinese Patent Application No. 200980134167.4.
Chinese Office Action issued in Chinese Application No. 200980134167.4 dated Apr. 22, 2014.
Chinese Office Action dated Nov. 5, 2014, issued in corresponding Chinese Patent Application No. 200980134167.4.

* cited by examiner (a)

(b)

(a)

(b)

(a)

(b)

(c)

(a)

(b)

TIRE

CROSS REFERENCE TO RELATED APPLICATION

This application is a National Stage of International Application No. PCT/JP2009/061850 filed Jun. 29, 2009, claiming priority based on Japanese Patent Application No. 2008-180330, filed Jul. 10, 2008, the contents of all of which are incorporated herein by reference in their entirety.

TECHNICAL FIELD

The present invention relates to a tire having, in a tread portion, at least one row of rib-like land portion and sipes provided in the rib-like land portion and, in particular, a tire for heavy load having such a tread construction. The present invention aims at enhancing wear resistance, with maintaining fraction performance on a wet road surface, of the tire.

RELATED ART

A rib-like land portion exhibits, due to high rigidity thereof, better wear resistance than a block land portion. However, a rib-like land portion has a problem that uneven wear referred to as "river wear", in which vicinities of a tread edge are locally worn in the circumferential direction, tends to occur therein. River wear as a kind of uneven wear occurs because small steps appearing in the vicinity of a rib edge due to a lateral force applied to a tire in running of the tire are dragged due to differences in diameter thereof and the dragged steps are subjected to sliding wear, whereby the amount of wear on the edge side of the rib-like land portion exceeds the amount of wear on the center side thereof.

On the other hand, for example, JP 06-080002 discloses a tire having a rib-like land portion provided with sipes in order to improve traction performance on a wet road surface of a tire having a rib-like land portion.

Patent document 1: JP 06-080002

DISCLOSURE OF THE INVENTION

Problems to be Solved by the Invention

In the tire of JP 06-080002, however, although fraction performance on a wet road surface is improved due to the sipes thereof, the rigidity of the rib-like land portion is lowered, whereby, when a lateral force is applied to the rib-like land portion in cornering situation, the land portion cannot resist the lateral force sufficiently and suffers from sliding wear, resulting in early occurrence of wear of an edge portion on the outer side in the tire widthwise direction of the rib-like land portion, in particular. As a result, difference in wear between the edge portion and the center portion of the rib-like land portion increases and uneven wear (river wear) occurs. When the respective edge portions of the rib-like land portion are compared with each other, the edge portion on the outer side in the tire widthwise direction of the rib-like land portion exhibits a large magnitude of wear than the edge portion on the inner side in the tire widthwise direction thereof because a larger lateral force is applied to the former.

Accordingly, an object of the present invention is to provide a tire having a rib-like land portion and sipes provided therein, in which wear resistance has been enhanced by optimizing the shape of the sipes, while good fraction performance on a wet road surface is maintained.

Means to Solve the Problems

In order to achieve the aforementioned object, the present invention provides a tire having, in a tread portion, at least one row of rib-like land portion and sipes provided in the rib-like land portion, characterized in that depth of each sipe at least at one end portion thereof on the shoulder side is smaller than depth of the sipe at the remaining portions thereof.

In the sipe, the minimum depth of the sipe is in the range of 0.50 to 0.95 times as much as the maximum depth thereof.

Further, the length in the tire widthwise direction of a portion having the maximum depth of the sipe is preferably in the range of 0.1 to 0.9 times as long as the length in the tire widthwise direction of the rib-like land portion.

Yet further, the length in the tire widthwise direction of the sipe is preferably at least 0.80 times as long as the length in the tire widthwise direction of the rib-like land portion.

Yet further, the depth of the sipe is preferably in the range of at least 0.30 times as much as the depth of each of circumferential grooves provided at respective sides of the rib-like land portion Yet further, it is preferable that the groove bottom of the sipe is provided with an enlarged portion having a length in the tire circumferential direction longer than the opening width of the sipe at a ground contact surface of the tread portion. In the present invention, "opening width of a sipe" represents a length in the tire circumferential direction of a sipe at a ground contact surface of a tread portion.

Yet further, it is preferable that the enlarged portion is provided at the groove bottom portion having the maximum depth of the sipe.

Yet further, it is preferable that: plural rows of block land portions are formed by demarcation by providing plural lateral grooves for communicating adjacent two circumferential grooves with each other; in at least two rows of block land portions adjacent to each other with a circumferential groove therebetween, among the rows of block land portions, the respective rows of block land portions are disposed to be offset with respect to each other in the tire circumferential direction; the extending direction of the groove portion between the block land portions adjacent to each other in the tire widthwise direction is inclined with respect to the tire widthwise direction and tire circumferential direction; and a distance between the block land portions adjacent to each other in the tire widthwise direction is shorter than a distance between the block land portions adjacent to each other in the tire circumferential direction. In the present invention, a "groove portion" represents a part of a circumferential groove extending between block land portions adjacent to each other in the tire widthwise direction, and being "disposed to be offset with respect to each other" represents differentiating starting points of disposure pitch in the tire circumferential direction of the block land portions adjacent to each other in the tire widthwise direction, with each other, so that the ends in the circumferential direction of one row of block land portions are not aligned with the ends in the circumferential direction of another row of block land portions adjacent to the one row in the tire widthwise direction.

Yet further, a length of each block land portion in a section in the tire widthwise direction thereof preferably increases from the respective ends in the tire circumferential direction of the block land portion toward the center portion thereof. In the present invention, "the center portion of a block land portion" represents a region extending, by the length of 5 to 30% of the length in the tire circumferential direction of the block land portion, from the center position to the respective ends in the tire circumferential direction of the block land portion. In short, "the center portion of a block land portion" represents a region obtained by excluding, from an entire block land portion, areas ranging from the respective end portions in the tire circumferential direction to positions inward therefrom by 20% of the length of the block land portion in the tire circumferential direction.

Yet further, the ratio of a distance between block land portions adjacent to each other in the tire circumferential direction with respect to a distance between block land portions adjacent to each other in the tire widthwise direction is preferably in the range of 1:0.85 to 1:0.3.

Yet further, the ratio of a distance between block land portions adjacent to each other in the tire circumferential direction with respect to the length in the tire circumferential direction of a block land portion is preferably in the range of 0.25:1 to 0.05:1.

Effect of the Invention

According to the present invention, it is possible to provide a tire having a rib-like land portion and sipes provided therein, in which wear resistance has been enhanced by optimizing the shape of the sipes, while good traction performance on a wet road surface is maintained.

BRIEF DESCRIPTION OF THE DRAWINGS

FIG. 11($b$) is a view showing a block land portion in contact with the ground due to being pushed diagonally with respect to a road surface.

FIG. 17($b$) is a section in the tire circumferential direction (cut along the line III-III of FIG. 16) of a rib-like land portion of the Comparative Example tire.

FIG. 18($b$) is a section in the tire circumferential direction (cut along the line III-III of FIG. 16) of a rib-like land portion of a tire of Example 1.

FIG. 19($b$) is a section in the tire circumferential direction (cut along the line III-III of FIG. 16) of a rib-like land portion of a tire of Example 2.

FIG. 20($b$) is a section in the tire circumferential direction (cut along the line III-III of FIG. 16) of a rib-like land portion of a tire of Example 3.

BEST MODE FOR CARRYING OUT THE INVENTION

Figure 1:
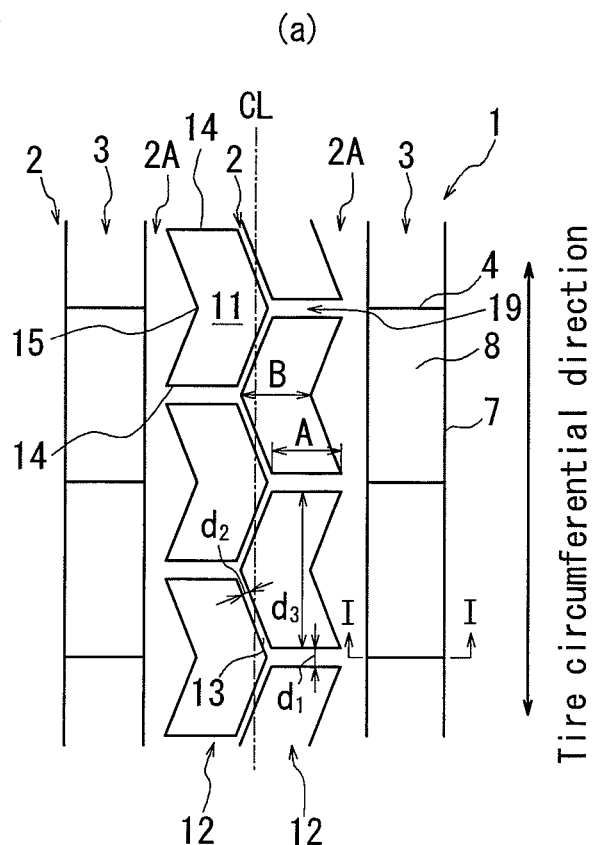
FIG. 1($a$) is a development view of a part of a tread portion of a representative tire according to the present invention, and FIG. 1($b$) is a section cut along the line I-I line in FIG. 1($a$).
Figure 1:
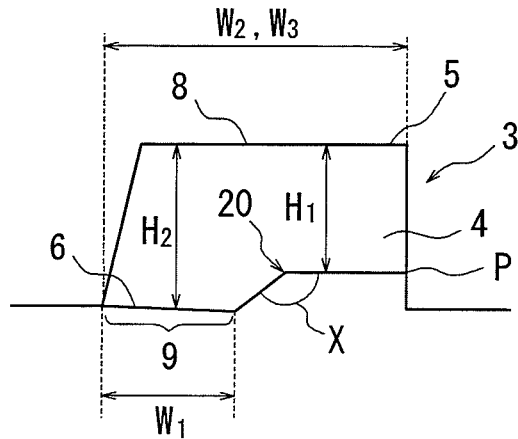
Figure 2:
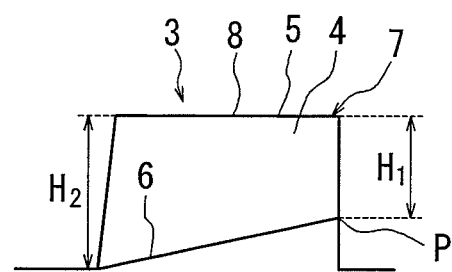
FIGS. 2($a$) and 2($b$) are sectional views of a rib-like land portion of another tire according to the present invention.
Figure 2:
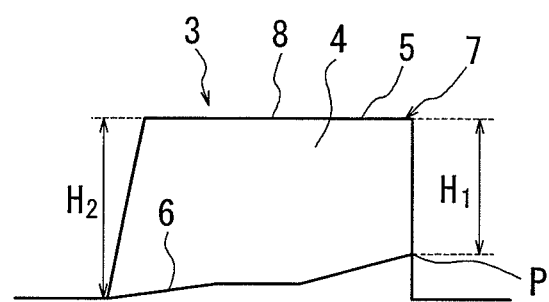
Figure 3:
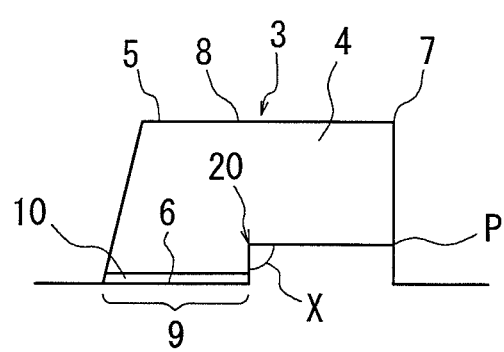
FIGS. 3($a$) to 3($c$) are a section in the tire widthwise direction, a section in the tire circumferential direction and a perspective view, respectively, of a rib-like land portion of yet another tire according to the present invention.
Figure 3:
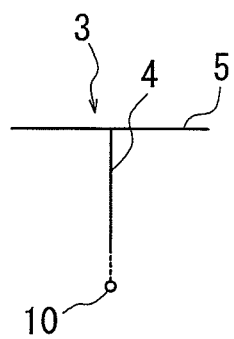
Figure 3:
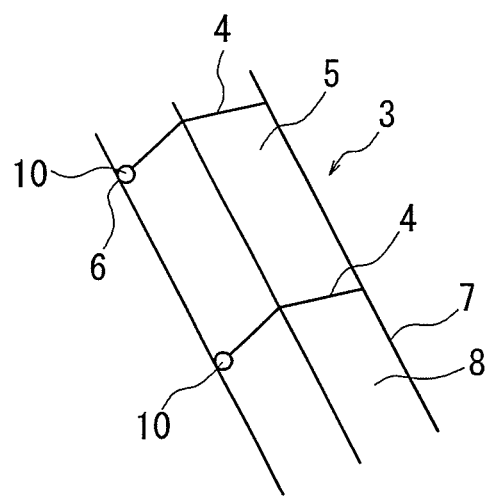
Figure 4:
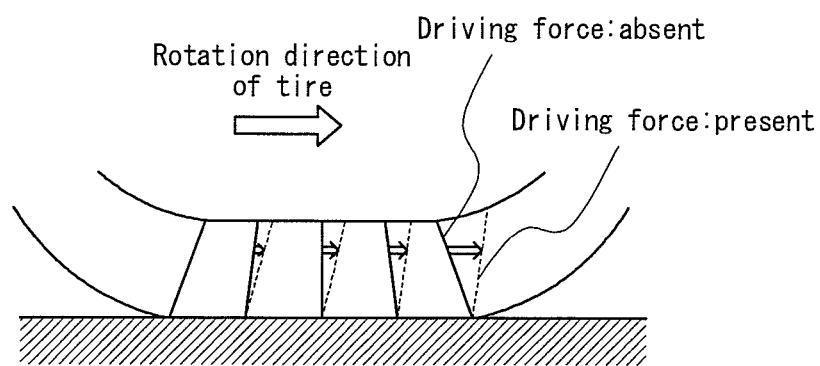
FIG. 4 is a view showing a relationship between presence/absence of driving force exertion and a shifted position of the tread portion.
Figure 5:
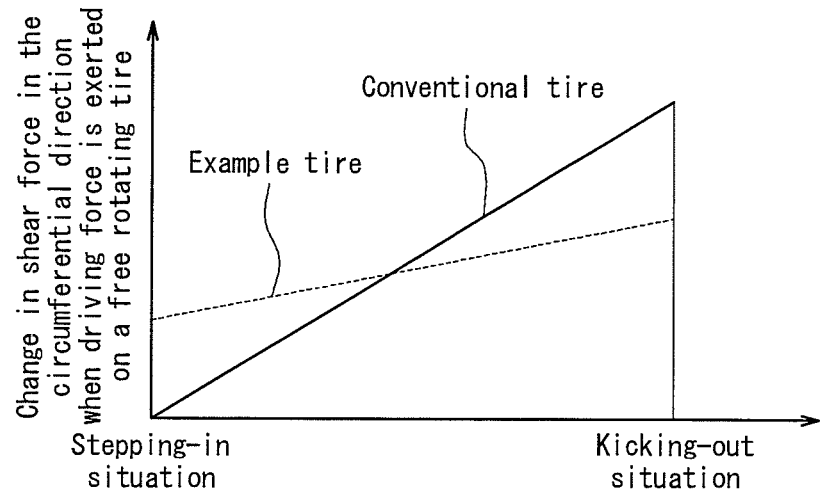
FIG. 5 is a view showing shear force applied from a road surface when driving force is exerted on the tread portion.
Figure 6:
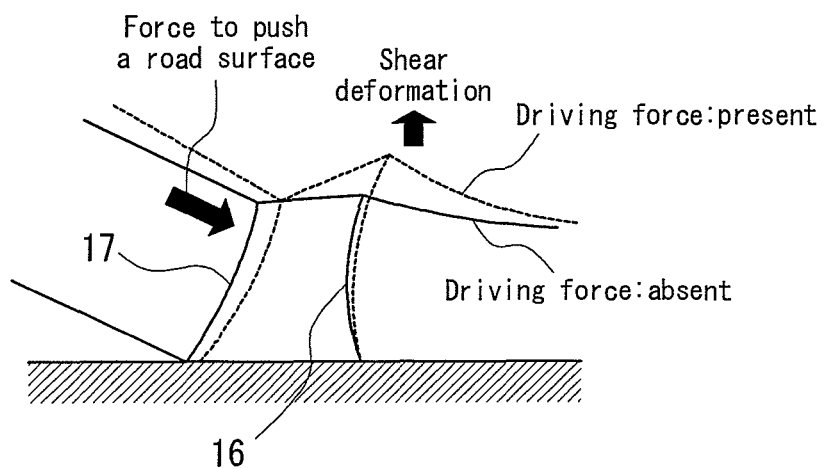
FIG. 6 is a view showing deformation in block land portions adjacent to each other when driving force is exerted thereon.
Figure 7:
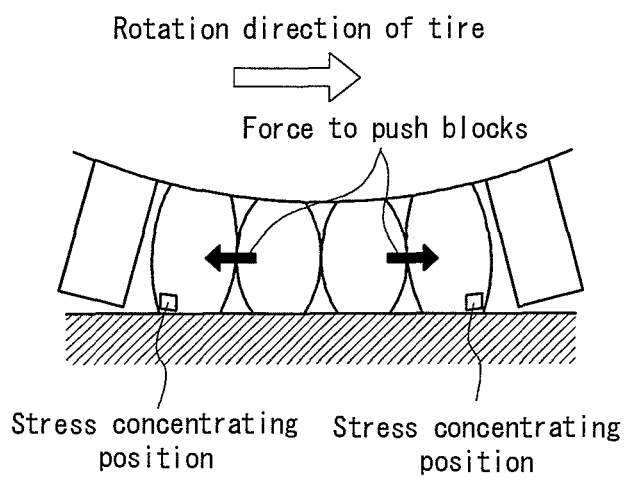
FIG. 7 is a view showing deformation in block land portions in a case where the block land portions adjacent in the tire circumferential direction are too close to each other.
Figure 8:
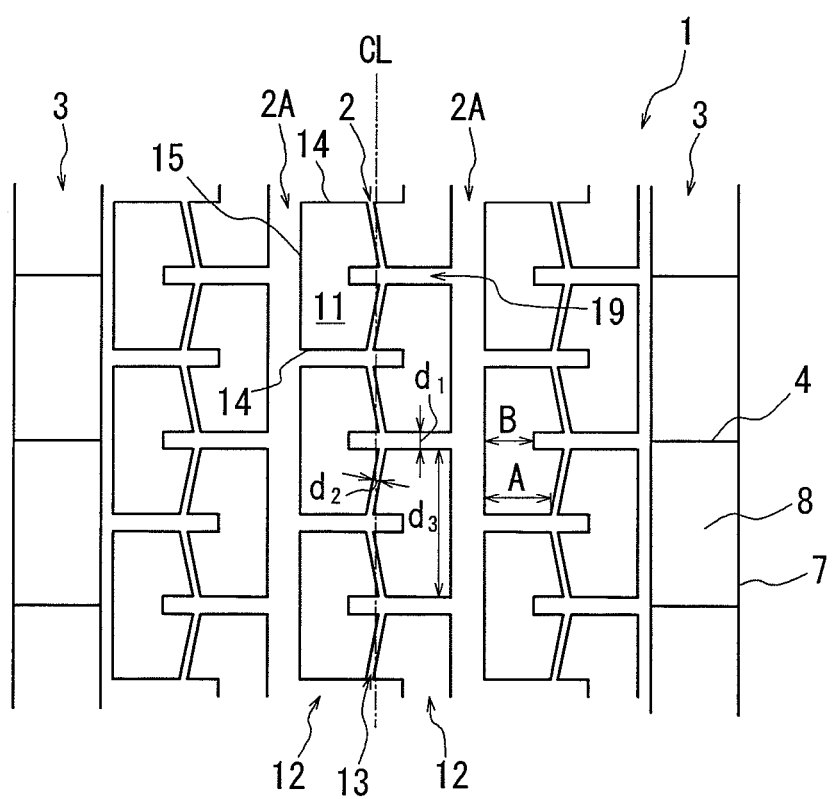
FIG. 8 is a development view of a part of a tread portion of yet another tire according to the present invention.
Figure 9:
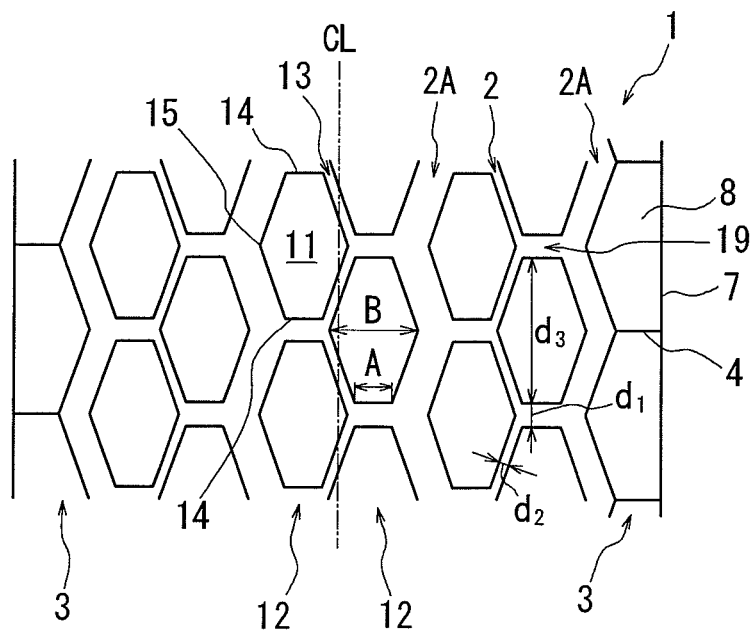
FIG. 9 is a development view of a part of a tread portion of yet another tire according to the present invention.
Figure 10:
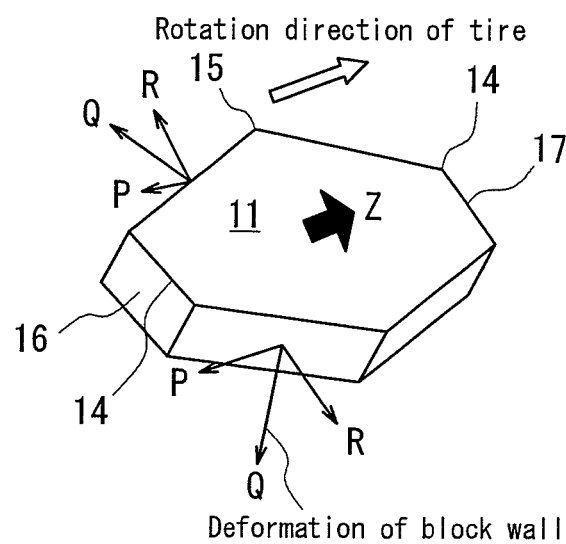
FIG. 10 is a perspective view of a block land portion as shown in FIG. 9 (the symbol Z represents deformation of rubber in a direction from a trailing edge to a leading edge, caused by being pushed diagonally).
Figure 11:
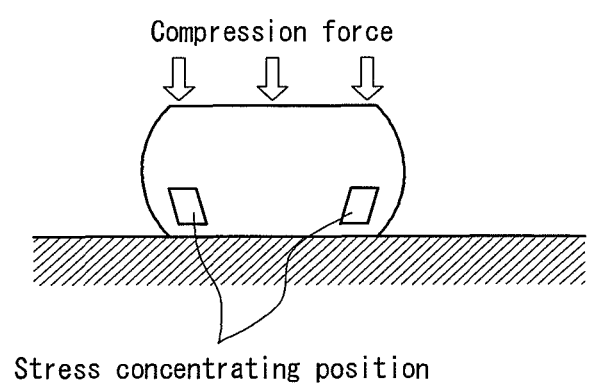
FIG. 11($a$) is a view showing a block land portion in contact with the ground due to being pushed horizontally with respect to a road surface.
Figure 11:
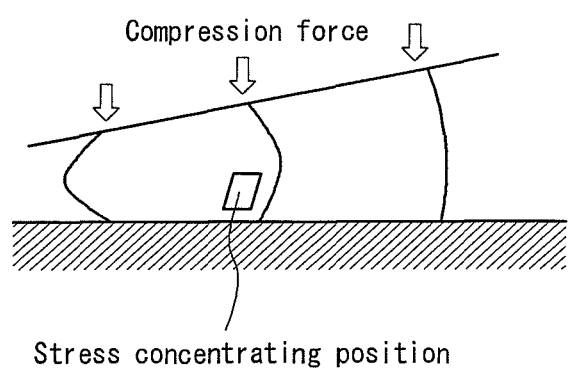
Figure 12:
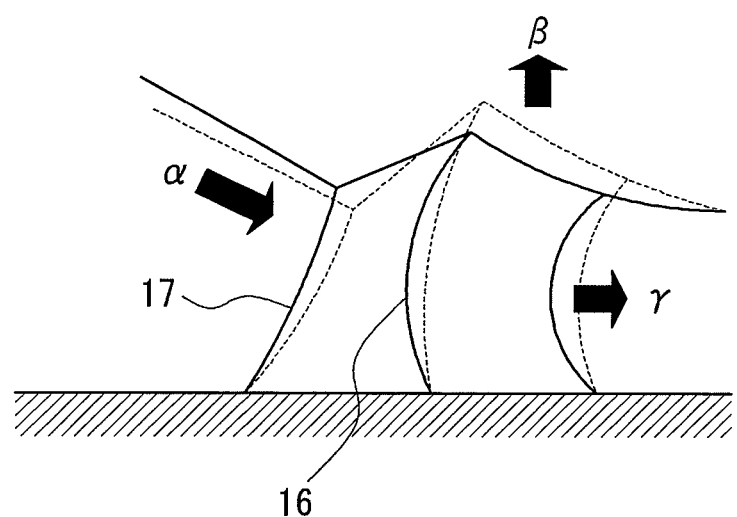
FIG. 12 is a view showing deformation in block land portions adjacent to each other when driving force is exerted thereon (symbol α represents increase in shear deformation in stepping-in situation, symbol β represents increase in "floating" of a trailing edge, and symbol γ represents decrease in deformation of tread rubber toward the opposite side of the rotation direction).
Figure 13:
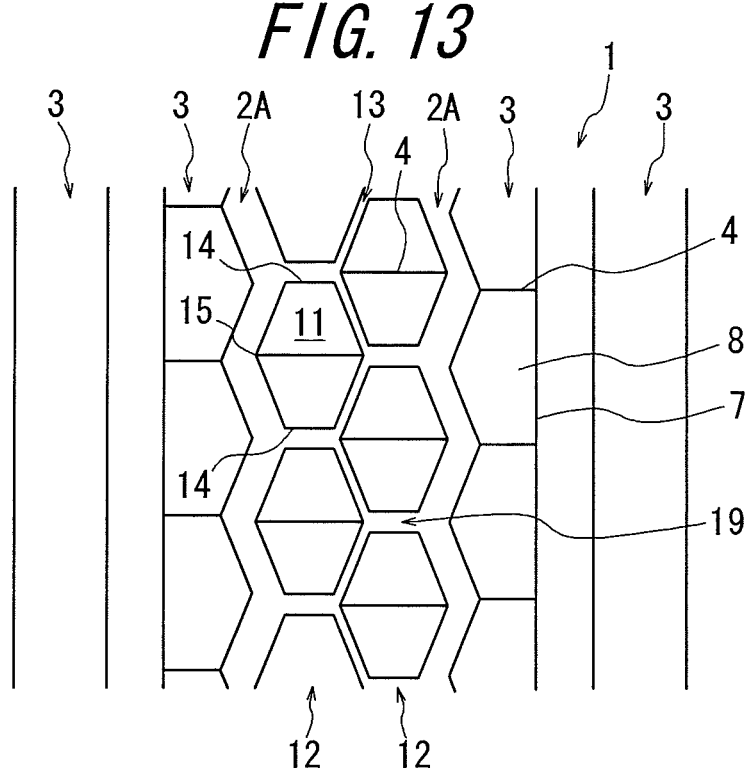
FIG. 13 is a development view of a part of a tread portion of yet another tire according to the present invention.
Figure 14:
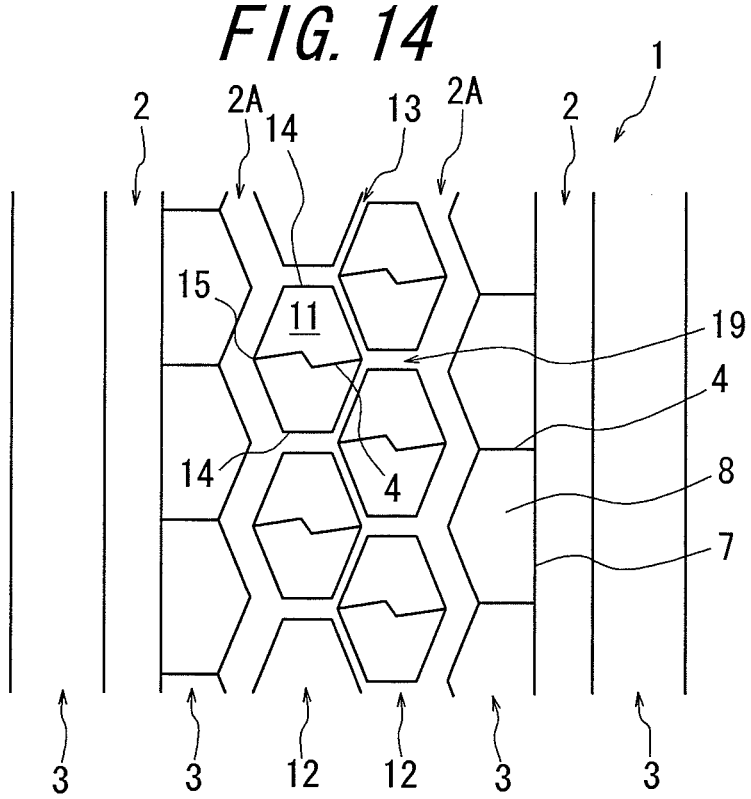
FIG. 14 is a development view of a part of a tread portion of yet another tire according to the present invention.
Figure 15:
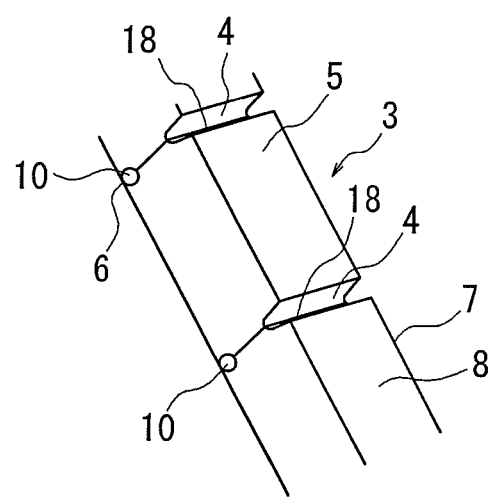
FIG. 15 is a perspective view of rib-like land portion of yet another tire according to the present invention.

Hereinafter, an embodiment of the present invention will be described with reference to the drawings. FIG. 1($a$) is a development view of a part of a tread portion of a representative tire according to the present invention, and FIG. 1($b$) is a section cut along the line I-I in FIG. 1($a$). FIGS. 2($a$) and 2($b$) are sectional views in the tire widthwise direction of a rib-like land portion of another tire according to the present invention. FIGS. 3($a$) to 3($c$) are a section in the tire widthwise direction, a section in the tire circumferential direction and a perspective view, respectively, of a rib-like land portion of yet another tire according to the present invention. FIG. 4 is a view showing a relationship between presence/absence of driving force exertion and a shifted position of the tread portion. FIG. 5 is a view showing shear force applied from a road surface when driving force is exerted on the tread portion. FIG. 6 is a view showing deformation in block land portions adjacent to each other when driving force is exerted thereon. FIG. 7 is a view showing deformation in block land portions in a case where the block land portions adjacent in the tire circumferential direction are too close to each other. FIGS. 8 and 9 are development views, respectively, of a part of a tread portion of yet other tires according to the present invention. FIG. 10 is a perspective view of a land portion as shown in FIG. 9. FIG. 11($a$) is a view showing a block land portion in contact with the ground due to being pushed horizontally with respect to a road surface. FIG. 11($b$) is a view showing a block land portion in contact with the ground due to being pushed diagonally with respect to a road surface. FIG. 12 is a view showing deformation in block land portions adjacent to each other when driving force is exerted thereon. FIG. 13 and FIG. 14 are development views, respectively, of a part of a tread portion of yet other tires according to the present invention. FIG. 15 is a perspective view of rib-like land portion of yet another tire according to the present invention.

In the tire of the present invention, as shown in FIG. 1(a) and FIG. 1(b), plural rows of rib-like land portions 3 are formed by demarcation in a tread portion 1 by providing the tread portion with plural circumferential grooves 2 extending in the tire circumferential direction. The rib-like land portion 3 is provided with a sipe 4 which communicates in the tire widthwise direction two circumferential grooves 2, 2 adjacent to the rib-like land portion. As shown in FIG. 1(b), the depth of the sipe 4 measured from a ground contact surface 5 of the tread portion 1 to the groove bottom 6 of the sipe is shorter at an end portion P on the shoulder side than at an end portion on the tire equatorial plane CL side, such that the groove bottom 6 on the shoulder side is positioned relatively shallow. By employing such a structure as described above and designing the depth of the sipe 4 provided in the rib-like land portion 3 shallower on the shoulder side, rigidity of the rib-like land portion 3 at an edge portion 7 on the outer side in the tire widthwise direction thereof is enhanced. Accordingly, when a lateral force is severely exerted on the edge portion 7 on the outer side in the tire widthwise direction of the rib-shaped land portion 3 in cornering situation, the edge portion 7 can satisfactorily resist such lateral force, whereby sliding wear in the edge portion 7 on the outer side in the tire widthwise direction is suppressed. As a result, difference in wear between the edge portion 7 on the outer side in the tire widthwise direction and the center portion 8 of the rib-like land portion 3 is made relatively small and thus uneven wear can be suppressed. In the sipe 4 as shown in FIG. 1, the depth of the groove bottom 6 is varied stepwise so that the groove bottom 6 has a stepped configuration having varied depth. However, as shown in FIG. 2(a), the depth of the sipe 4 can be varied by monotonously slanting the groove bottom 6 of the sipe 4 with respect to the tire widthwise direction. Alternatively, as shown in FIG. 2(b), the depth of the sipe 4 can be varied by slanting the groove bottom 6 of the sipe 4 at plural sites at plural different angles.

In the depth of the sipe 4, the minimum depth $H_1$ is in the range of 0.50 to 0.95 times as much as the maximum depth $H_2$ thereof. In a case where the minimum depth $H_1$ is smaller than 0.50 times as much as the maximum depth $H_2$, although rigidity at the edge portion 7 on the outer side in the tire widthwise direction of the rib-like land portion 3 is sufficiently enhanced and thus uneven wear is suppressed, the fraction performance on a wet road surface, which is supposed to be improved by provision of the sipe 4, may deteriorate. In a case where the minimum depth $H_1$ exceeds 0.95 times as much as the maximum depth $H_2$, although good fraction performance on a wet road surface is sufficiently ensured by provision of the sipe 4, uneven wear may not be effectively prevented from occurring because rigidity of the edge portion 7 on the outer side in the tire widthwise direction of the rib-like land portion 3 is not sufficiently enhanced. In view of the facts above, it is further preferable that, regarding the depth of the sipe 4, the minimum depth $H_1$ is in the range of 0.60 to 0.85 times as much as the maximum depth $H_2$ thereof.

Further, the length $W_1$ in the tire widthwise direction of a portion 9 having the maximum depth $H_2$ of the sipe 4 is preferably in the range of 0.1 to 0.9 times as long as the length $W_2$ in the tire widthwise direction of the rib-like land portion 3. In a case where the length $W_1$ in the tire widthwise direction of a portion 9 having the maximum depth $H_2$ exceeds 0.9 times as long as the length $W_2$ in the tire widthwise direction of the rib-like land portion 3, although fraction performance on a wet road surface is effectively improved by provision of the sipe 4, uneven wear may not be effectively prevented from occurring because rigidity of the edge portion 7 on the outer side in the tire widthwise direction of the rib-like land portion 3 is not sufficiently enhanced. In a case where the length $W_1$ in the tire widthwise direction of the portion 9 having the maximum depth $H_2$ is shorter than 0.1 times as long as the length $W_2$ in the tire widthwise direction of the rib-like land portion 3, although rigidity at the edge portion 7 on the outer side in the tire widthwise direction of the rib-like land portion 3 is effectively ensured and thus uneven wear is suppressed, the traction performance on a wet road surface, which is supposed to be improved by provision of the sipe 4, may not be improved in a satisfactory manner.

Yet further, the length $W_3$ in the tire widthwise direction of the sipe 4 is preferably at least 0.80 times as long as the length $W_2$ in the tire widthwise direction of the rib-like land portion 3. In a case where the length $W_3$ in the tire widthwise direction of the sipe 4 is shorter than 0.80 times as long as the length $W_2$ in the tire widthwise direction of the rib-like land portion 3, fraction performance on a wet road surface may not be sufficiently improved, in spite of provision of the sipe 4. Further, the depth of the sipe is preferably in the range of at least 0.30 times as much as the depth of each of the circumferential grooves 2, 2 provided at each side of the rib-like land portion. In a case where the depth of the sipe 4 is smaller than 0.30 times as much as the depth of each of the circumferential grooves 2, 2 provided at respective sides of the rib-like land portion 3, fraction performance on a wet road surface may not be sufficiently improved, in spite of provision of the sipe 4. In a case where the depths of the two circumferential grooves 2, 2 provided at the respective sides of the rib-like land portion 3 are different from each other, it is preferable that the depth of the sipe 4 is at least 0.3 times as much as the depth of the deeper circumferential groove 2.

Yet further, as shown in FIGS. 3(a) to 3(c), it is preferable that the groove bottom 6 of the sipe 4 is provided with an enlarged portion 10 having a length in the tire circumferential direction longer than the opening width of the sipe 4 at a ground contact surface 5 of the tread portion. In general, when a tire is rotated with a load applied thereon, rubber of the sipe on the groove bottom side thereof is deformed repeatedly and stress is repeatedly exerted on the rubber at the groove bottom of the sipe, whereby a crack may be generated at the groove bottom due to deterioration of the rubber thereat. To address this problem, an enlarged portion 10 is provided at the sipe 4 on the groove bottom side thereof so that stress concentrating on the rubber at the groove bottom of the sipe 4 is dissipated with good balance and crack generation in the rubber of the sipe 4 on the groove bottom side is suppressed. The enlarged portion 10 is preferably only provided in the groove bottom portion 9 having the maximum depth. In general, the larger depth of the sipe results in the lower rigidity of the rib-like land portion and the larger magnitude of deformation of rubber during tire rotation with a load applied thereon, and thus the larger stress exerted on the groove bottom of the sipe. Due to this, at the groove bottom of the sipe, the groove bottom portion having the maximum depth tins tends to receive intensive stress and thus cracks are likely to be generated in the portion. In order to address this problem, the enlarged portion 10 is only provided at the groove bottom portion 9 having the maximum depth so that stress exerted on the groove bottom portion 9 is efficiently dissipated and cracks are prevented from being generated. Further, a mold for forming the enlarged portion 10 only at the groove bottom portion having the maximum depth can be easily produced because the structure thereof is simpler than that of a mold for forming the enlarged portion 10 in the entire region of the groove bottom 6 of the sipe 4.

Yet further, the length in the circumferential direction of the sipe 4 is preferably shorter than 1.5 mm. In a case where the length in the circumferential direction of the sipe 4 is equal to or exceeds 1.5 mm, the rib-like land portions 3 are separated from each other significantly wide in the tire circumferential direction, whereby uneven wear due to heal-and-toe wear occurs and rigidity of the rib-like land portion deteriorates, possibly resulting in deterioration of driving stability. In general, the technically produceable length in the tire circumferential direction of a sipe, which can ensure the sipe functions, is approximately 0.5 mm.

Further, in general, since a tire for heavy load has a relatively large aspect ratio and high rigidity of belt, when the tire is rotated with a load exerted thereon, difference in displacement occurs between a belt portion and a tread portion, as shown in FIG. 4, due the rotation of the belt portion caused by driving force applied thereon and friction experienced by the tread portion in contact with the ground, whereby the tread portion collapse-deforms excessively. As a result, driving force exerted per unit area of the tread portion increases and "sliding phenomenon" of block land portions with respect to a road surface occurs, whereby an amount of wear in the block land portions increases due to the sliding phenomenon.

In this regard, the inventor of the present invention has discovered that, as a result of decrease in the ground-contact area in a tread surface caused by increase in belt rigidity, shear force in the circumferential direction in tread kicking-out situation, during which sliding wear may occur, excessively increases and wear resistance of the tire deteriorates accordingly. FIG. 5 shows change (from a state in which no driving force is exerted to a state in which driving force is applied on the tire) in shear force in the tire circumferential direction, i.e. a force in the tire driving direction acting on the ground contact surface of the tire, from stepping-in situation to kicking-out situation at a given position of a block land portion in contact with the a road surface. In a conventional tire, as shown in the solid line, shear force in the circumferential direction hardly exhibits any change from a state in which no driving force is exerted, in stepping-in situation, and then monotonously increases until kicking-out situation. The total sum of the forces generated in a period from the stepping-in situation to the kicking-out situation (the integral value of the shear force in the tire circumferential direction generated in a period from the stepping-in situation to the kicking-out situation) accelerates a vehicle as a force acting on the tire axis. In a case in which the ground contact area is decreased, decrease in the integral value caused by the decrease in the ground contact area is compensated by steep change or increase per unit area in a period from stepping-in situation to kicking-out situation, whereby shear force in the tire circumferential direction in kicking-out of a block increases and wear resistance deteriorates accordingly. There is an idea that, as shown in FIG. 5 by a broken line, the aforementioned problem or steep increase in shear force in the circumferential direction in kicking-out situation can be addressed or compensated by lowering shear force in the circumferential direction in kicking-out situation by making shear force in the circumferential direction be already generated at the stage of stepping-in situation (or causing change in shear force to occur already when no driving force is exerted yet). On this basis, the inventor, as a result of a keen study, discovered that: when driving force is exerted, a block land portion which has already been stepped-in experiences "floating" due to increase in shear deformation thereof, as shown in FIG. 6; and deformation of a next block land portion which is then pushed on a road surface increases due to the reaction of the aforementioned "floating", whereby a force is efficiently generated in the next block land portion in stepping-in situation and the characteristics as shown by the broken line in FIG. 5 can be demonstrated. It has also been discovered that this phenomenon can be effectively demonstrated by making block land portions closer to each other in the tire circumferential direction. However, when block land portions are made closer to each other in the tire circumferential direction, as shown in FIG. 7, a force in the same direction as the driving force in kicking-out situation is generated due to contact of block land portions with each other when these block land portions contact the ground, whereby wear resistance deteriorates. In view of this fact, the inventor searched a structure which can effectively utilize an action between block land portions and eliminate an effect caused by contact of the block land portions with each other in the tire circumferential direction, discovering the structure as described below.

In the structure of a tire discovered by the inventor, plural circumferential grooves 2 extending in the tire circumferential direction and plural lateral grooves 19 communicating two adjacent circumferential grooves 2, 2 are provided in a land portion between rib-like land portions 3, 3 having sipes as described above, whereby plural block land portion rows 12, constituted of a large number of block land portions 11, are formed by demarcation. Further, in the structure above: the extending direction of the groove portion 13 between the block land portions adjacent to each other in the tire widthwise direction is inclined with respect to the tire widthwise direction and the tire circumferential direction; the distance $d_2$ between block land portions adjacent to each other in the tire widthwise direction is shorter than the distance $d_1$ between block land portions adjacent to each other in the tire circumferential direction; and, in the block land portion rows 12, 12 adjacent to each other in the tire widthwise direction, the block land portions 11 constituting one row are offset with respect to the block land portions 11 constituting the other row in the tire circumferential direction. Since the extending direction of the groove portion 13 between the block land portions adjacent to each other in the tire widthwise direction is inclined with respect to the tire widthwise direction and the tire circumferential direction and the distance $d_2$ between block land portions adjacent to each other in the tire widthwise direction is shorter than the distance $d_1$ between block land portions adjacent to each other in the tire circumferential direction, significant driving force exerted per unit area can be efficiently generated at the state of stepping-in situation already by reaction between the block land portions 11, as shown in FIG. 4, by utilizing the features that the groove portion 13 between the block land portions adjacent to each other in the tire widthwise direction is inclined with respect to the tire circumferential direction and the tire widthwise direction and that the distance between the block land portions is relatively small, with suppressing the expanding component of rubber (see FIG. 7) due to contact of the block land portions 11 adjacent in the tire circumferential direction with each other. As a result, the tangent of change in shear force in the circumferential direction in a period from stepping-in situation to kicking-out situation is made relatively small, whereby sliding wear can be effectively suppressed. Accordingly, uneven wear by river wear is suppressed in the rib-like land portions 3 located on the shoulder side and uneven wear due to sliding wear is also suppressed in the block land portion rows 12 between the rib-like land portions 3, 3 for the reasons described above. Therefore, wear resistance of the tire as a whole is improved and the product life of the tire, until discarding it, can be prolonged. It is preferable that the block land portions 11 adjacent to each other in the tire widthwise direction are disposed such that the block land portions of one row are offset in the tire circumferential direction with respect to the block land portions of the other row by a half pitch. Since the block land portions 11 are disposed in a half-pitch offset manner as described above, deformation force in which a block land portion collapse-deforms when the tire is rotated with a load exerted thereon can be effectively transferred by the block land portions 11 adjacent to each other in the tire widthwise direction, whereby driving force exerted per unit area of the tread portion 1 is lowered and wear of the block land portion 11 due to sliding phenomenon with respect to a road surface can be prevented. As a result, the tangent of change in shear force in the tire circumferential direction in a period from stepping-in situation to kicking-out situation is made relatively small and shear force in kicking-out situation, in which sliding wear may occur, is reduced, so that sliding wear is reduced.

Further, in terms of effectively suppressing sliding wear, an inclination angle formed by the extending direction of the groove portion 13 between the block land portions adjacent to each other in the tire widthwise direction, with respect to the tire circumferential direction, is preferably in the range of 15° to 70°. Yet further, in view of the interactions between the block land portions as described above and in order to maintain these interactions until the final period of wear, the groove depth of the groove portion 13 between the block land portions adjacent to each other in the tire widthwise direction is preferably in the range of 60 to 100% of the groove depth of the circumferential groove 2A. In the present invention, the structure of the tread portion 1 of the tire according to the present invention is not limited to the structure as shown in FIG. 1 and other structures may be employed as long as the aforementioned conditions are satisfied. For example, as shown in FIG. 8, the length of the block land portion 11 in a section in the tire widthwise direction may have a shape in which the length is increased from the respective edge portions 14, 14 in the tire circumferential direction to the center portion 15 (and then shortened).

Yet further, as shown in FIG. 9 and FIG. 10, the length of the block land portion 11 in a section in the tire widthwise direction preferably increases from the respective edge portions 14, 14 in the tire circumferential direction of the block land portion 11 to the center portion 15 thereof. As a result of a keen study of wear in block land portions when a tire having block land portions, in particular, a tire for heavy load having relatively high aspect ratio is used as a driving tire, the inventor has made discoveries as described below. Specifically, when a block land portion is pushed against the ground and brought into contact therewith horizontally with respect to a road surface, the stress generated due to non-compressibility of rubber concentrates on the leading edge and the trailing edge of the block land portion, as shown in FIG. 11(a). However, in kicking-off situation when tread wear may occur due to sliding of a tread portion, since the tread portion is pushed against the ground in a slanted manner with respect to the road surface by a belt, the stress generated due to non-compressibility of the rubber is exerted on the center portion of the block land portion, as show in FIG. 11(b). In particular, in the case of a tire having a relatively high aspect ratio and relatively high belt rigidity, since the tread portion is strongly pushed against the ground in a slanted manner with respect to the road surface, the stress generated due to non-compressibility of the rubber is strongly exerted on the center portion of the block land portion accordingly. The force generated by this compressive deformation is exerted in the same direction as the moving direction of a vehicle and enhanced by driving force of an engine torque, thereby increasing sliding wear. In the structure described above where the length of the block land portion 11 of a section in the tire widthwise direction thereof is increased from the respective edge portions 14, 14 in the tire circumferential direction of the block land portion 11 toward the center portion 15 of the same block land portion 11, when the block land portion 11 is brought into contact with the ground in a slanted manner with respect to a road surface and whereby the compressive stress concentrates on the center region of the block land portion 11, as shown in FIG. 11(b), and a force to deform the rubber at the center portion of the block land portion 11 from the trailing edge 16 to the leading edge 17 is generated, a force Q to expand a wall inclined with respect to the tire circumferential direction on the trailing side of the block land portion 11, in a direction normal to the wall, is generated as shown in FIG. 10. A component of force R of the expanding force Q described above is generated at each of the left hand side and right hand side of the walls of the block land portion 11 and the respective components of force R opposite to each other are cancelled out between the block land portions 11. Further, the other component of force P of the force Q resists against the force to deform the rubber at the center portion of the block land portion 11 from the trailing edge 16 to the leading edge 17. As a result, excessive deformation of the block land portion 11 is suppressed and thus uneven wear and sliding wear of the block land portion 11 can be prevented. Further, as shown in FIG. 12, comparing the deformation (broken lines) of the block land portion 11 employing the shape and the arrangement as described above when driving force is exerted thereon, with the deformation (solid lines) of a conventional block land portion when driving force is exerted thereon, in the block land portion 11 of the resent invention, deformation of rubber toward the block trailing edge side is suppressed in stepping-in situation due to a mechanism similar to that in block kicking-out situation. However, this suppressed deformation acts, due to non-compressibility of rubber, in a direction which enhances the magnitude of "floating" of the trailing edge 16 of the block land portion 11 which has already been stepped in. Accordingly, the magnitude of shear deformation of the block land portion 11, which is to be stepped-in next, increases, whereby there is obtained a synergetic effect that shear force in stepping-in situation is enhanced, as shown in FIG. 5, whereas shear force in kicking-out situation, which significantly affects degree of wear, is lowered. In this case, the ratio of the length A in the tire widthwise direction of the center portion 15 of the block land portion 11 with respect to the length B in the tire widthwise direction of the edge 14 in the tire circumferential direction of the block land portion 11 is preferably in the range of 1:3 to 1:1.5. In a case where the ratio is out of the aforementioned range, deformation of the block land portion 11 may not be effectively prevented when the block land portion 11 is brought into contact with the ground in a slanted manner with respect to a road surface, whereby uneven wear and sliding wear of the block land portion 11 may occur.

Further, the respective groove portions 13 in one block land portion 11 facing the same circumferential groove 2, which groove portions 13 are between the one block land portion and the other block land portion adjacent to each other in the tire widthwise direction, are preferably inclined with respect to the tire equatorial plane in directions opposite to each other. If the extending direction of the aforementioned groove portions 13 between the block land portions adjacent to each other in the tire widthwise direction were to be inclined with respect to the equatorial plane in the same direction, although sliding wear would be effectively prevented for an input from a certain direction, an input from other directions would not be effectively addressed and sliding wear derived from the input from other directions would not be successfully prevented. Further, since the inclined extending directions of the groove portions between the block land portions adjacent to each other in the tire widthwise direction described above are complementarily combined, in arrangement, with the inclinations of the walls of the block land portion 11 resulted from the shape in which the length of the block land portion 11 in a section in the tire widthwise direction thereof is increased toward the center portion 15 of the block land portion 11, a block pattern can be designed without creating meaningless spaces in the tire widthwise direction, such that wear resistance performance is effectively demonstrated without marring either the structures or effects resulted from the aforementioned two inclinations. Accordingly, a pattern designing by combining the aforementioned block pattern with a second rib, a shoulder rib, a lug and the like is made easy.

Yet further, the length $d_3$ in the tire circumferential direction of the block land portion 11 is preferably in the range of 1.0 to 2.5% of the tire circumferential length. In order to effectively achieve the aforementioned effect of the block land portion 11 of the present invention, it is preferable that the length $d_3$ in the tire circumferential direction of the block land portion 11 is equal to or shorter than 2.5% of the tire circumferential length. In a case where the length $d_3$ exceeds 2.5% of the tire circumferential length, shear rigidity of the block excessively increases and the "floating" of the block land portion 4 which has already been stepped-in, as described above, may not be sufficiently achieved. Even in a case where the length $d_3$ is equal to or shorter than 2.5% of the tire circumferential length, if the length $d_3$ is shorter than 1.0% of the tire circumferential length, rigidity of the block land portion 11 is reduced too low and the block land portion 11 shear-deforms excessively when driving force is exerted on the block land portion 11, whereby sliding wear cannot be suppressed sufficiently. Therefore, by setting the length $d_3$ in the tire circumferential direction of the block land portion 11 in the range of 1.0 to 2.5% of the tire circumferential length, rigidity of the block land portion 11 is ensured and the effect of the block land portion 11 described above is effectively achieved, whereby deterioration in wear resistance can be prevented.

Yet further, the ratio of a distance $d_2$ between block land portions adjacent to each other in the tire circumferential direction with respect to a distance $d_1$ between block land portions adjacent to each other in the tire widthwise direction is preferably in the range of 1:0.85 to 1:0.3 and more preferably in the range of 1:0.7 to 1:0.4. In a case where the ratio of a distance $d_2$ between block land portions adjacent to each other in the tire circumference direction with respect to a distance $d_1$ between block land portions adjacent to each other in the tire widthwise direction is larger than 1:0.3, although the distance $d_1$ between block land portions adjacent to each other in the tire circumferential direction is sufficient, the distance $d_2$ between block land portions adjacent to each other in the tire widthwise direction is too short. Due to this, the block land portions 11 adjacent to each other in the tire widthwise direction are brought into contact with each other when the tire is rotated with a load exerted thereon and deforming force to collapse-deform is not effectively transferred from one block land portion 11 to another block land portion 11 adjacent thereto, whereby shear force in the block land portion 11 is not effectively dissipated and sliding wear may be resulted. In a case where the ratio of a distance $d_2$ between block land portions adjacent to each other in the tire circumferential direction with respect to a distance $d_1$ between block land portions adjacent to each other in the tire widthwise direction is smaller than 1:0.85, although the distance $d_2$ between block land portions adjacent to each other in the tire widthwise direction is sufficient, the distance $d_1$ between block land portions adjacent to each other in the tire circumferential direction is too short. Accordingly, the block land portions 11 are in contact with each other in the tire circumferential direction when these block land portions 11 are brought into contact with a road surface, whereby deformation due to expansion of rubber occurs, as shown in FIG. 7 and wear resistance may deteriorate.

Yet further, the ratio of a distance $d_1$ between block land portions 11 adjacent to each other in the tire circumferential direction with respect to the length $d_3$ in the tire circumferential direction of the block land portion 11 is preferably in the range of 0.25:1 to 0.05:1 and more preferably in the range of 0.17:1 to 0.07:1. In a case where the ratio of a distance $d_1$ between block land portions 11 adjacent to each other in the tire circumferential direction with respect to the length $d_3$ in the tire circumferential direction of the block land portion 11 exceeds 0.05:1, the block land portions 11 adjacent in the tire circumferential direction contact with each other too close when these block land portions 11 collapse-deform in rotation of the tire with a load exerted thereon. Accordingly, as shown in FIG. 7, when the block land portions 11 of the tread portion 1 in contact with a road surface are pushed and deformed, the block land portions 11 adjacent in the tire circumferential direction contact with each other at the center of the tread portion 1 and push other block land portions 11 disposed on the outer side thereof toward the outer side in the tire circumferential direction, whereby these other block land portions 11 collapse-deform excessively both in the tire rotating direction and the direction opposite thereto. As a result, a force in the same direction as the direction in which driving force is exerted is increased at the trailing edge 16, possibly causing sliding wear due to such collapse-deformation as described above. In a case where the ratio of a distance $d_1$ between block land portions 11 adjacent to each other in the tire circumferential direction with respect to the length $d_3$ in the tire circumferential direction of the block land portion 11 is smaller than 0.25:1, the block land portions 11 adjacent in the tire circumferential direction are separated from each other too much, whereby shear force of the block land portion 11 adjacent to each other in the tire circumferential direction can no longer be dissipated with good balance by utilizing the shear force at the trailing edge 16 of the block land portion 11 and therefore sliding wear may occur.

Yet further, the distance $d_2$ between the block land portions adjacent to each other in the tire widthwise direction is preferably in the range of 1.0 to 5.0 mm and more preferably in the range of 1.5 to 3.5 mm. In a case where the distance $d_2$ between the block land portions exceeds 5.0 mm, the distance $d_2$ between the block land portions adjacent to each other in the tire widthwise direction is too long. As a result, deformation force to collapse-deform one block land portion 11 cannot be transferred to another block land portion 11 adjacent thereto in the widthwise direction, whereby excessive collapse-deformation in the tire circumferential direction of the one block land portion is caused and wear due to sliding of the block land portion 11 may be resulted. In a case where the distance $d_2$ between the block land portions is shorter than 1.0 mm, the distance $d_2$ between the block land portions adjacent to each other in the tire widthwise direction is too short. As a result, the block land portions 11 adjacent in the tire widthwise direction contact with each other when the tire is rotated with a load exerted thereon and deformation force to collapse-deform one block land portion 11 cannot be effectively transferred to another block land portion 11 adjacent thereto in the widthwise direction, whereby excessive collapse-deformation is caused and wear due to sliding of the block land portion 11 may be resulted.

Yet further, the distance $d_1$ between the block land portions 11 adjacent to each other in the tire circumferential direction is preferably in the range of 3.0 to 10.0 mm and more preferably in the range of 4.0 to 8.0 mm. In a case where the distance $d_1$ between the block land portions adjacent to each other in the tire circumferential direction exceeds 10.0 mm, the distance $d_1$ between the block land portions adjacent to each other in the tire circumferential direction is too long. As a result, the ground-contact pressure of the block land portion 11 rises up excessively, possibly causing wear resistance to deteriorate. In a case where the distance $d_1$ between the block land portions adjacent to each other in the tire circumferential direction is shorter than 3.0 mm, the distance $d_1$ between the block land portions adjacent to each other in the tire circumferential direction is too short. As a result, the block land portions 11 contact with each other in the tire circumferential direction when these block land portions 11 are brought into contact with a road surface and deformation due to expansion of rubber as shown in FIG. 7 occurs, possibly causing wear resistance to deteriorate.

Yet further, as shown in FIG. 13 and FIG. 14, the block land portion 11 is preferably provided with a sipe 4 which communicates in the tire widthwise direction the two circumferential grooves 2A, 2A each adjacent to the block land portion 11. By providing the block land portion 11 with an additional trailing edge 16, gripping force of the block land portion 11 as a whole can be enhanced, whereby torque from the engine can be efficiently converted into driving force. The sipe 4 may bend either linearly or in a curved manner in the block land portion 11.

Yet further, the sipe 4 provided in the block land portion 11 preferably opens to the circumferential grooves 2 at the center portion 15 of the block land portion 11. In a case where the sipe 4 opens in a region other than the center portion 15 of the block land portion 11, gripping force as the driving force can no longer be dissipated with good balance within the block land portion 11, whereby there is a possibility that torque from the engine cannot be efficiently converted into driving force.

Yet further, the length in the tire circumferential direction of the sipe 4 provided in the block land portion 11 is preferably in the range of 5 to 20% and more preferably in the range of 7 to 18% of the groove depth (depth in the radial direction) of the lateral groove 19. In a case where the length in the tire circumferential direction of the sipe 4 is shorter than 5% of the groove depth of the lateral groove 19, the length in the tire circumferential direction of the sipe 4 is too short. As a result, gripping force from the leading edge 17 toward the trailing edge 16 deteriorates to the level of gripping force observed in a case where no sipe is provided in the block land portion 11, possibly rendering provision of the sipe 4 meaningless. In a case where the length in the tire circumferential direction of the sipe 4 exceeds 20% of the groove depth of the lateral groove 19, the length in the tire circumferential direction of the sipe 4 is too long. As a result, the block land portions 11, each of which is sectioned into sub-portions by the sipe 4, can no longer transfer force by reaction between the block land portions 11, whereby excessive collapse-deformation may occur, followed by sliding wear due to the deformation. In order to obtain a satisfactory effect until the final stage of wear, the groove depth of the sipe 4 in the block land portion 11 is preferably 60 to 100% of the groove depth of the lateral groove 19.

The foregoing descriptions only explain a part of the embodiments of the present invention. The structures described above may be combined with each other or subjected to various modification, unless such combination or modification digresses the spirit of the present invention. For example, although the tire having the structure as shown in FIGS. 1, 8, 9, 13 and 14 is provided with at least one unit of block land portion rows 12 in the ground contact surface of the tread portion, wherein each unit includes two block land portion rows 12, there may be provided in the ground contact surface of the tread at least one unit of block land portion rows, each unit including three or more block land portion rows 12. Further, as shown in FIG. 15, the region where the sipe 4 is provided may be modified to a shallow groove 18, so that drainage performance is further improved. Yet further, the following structure is preferable in terms of dissipating stress concentrating on a connecting region 20 between the region having the maximum groove depth and the region having the minimum groove depth at the groove bottom 6 of the sipe 4 when the sipes of the rib-like land portion 3 deforms by inputs in the tire circumferential direction in rotation of the tire with a load exerted thereon, to prevent cracks (tear) from occurring. Specifically, the inclination angle X formed by the connection region 20 with respect to the tire widthwise direction (the tire axial direction) is preferably an obtuse angle in the range of 110° to 160°. In a case where the inclination angle X exceeds 160°, rigidity at the edge portion 7 on the outer side in the tire widthwise direction of the rib-like land portion 3 is not sufficiently enhanced (and thus difference in rigidity within the rib-like land portion 3 cannot be ensured), whereby the effect of suppressing uneven wear by making difference in rigidity within the rib-like land portion 3 relatively small may not be demonstrated in a satisfactory manner. In a case where the inclination angle X is smaller than 110°, stress concentrating on the connecting region 20 between the region having the maximum groove depth and the region having the minimum groove depth cannot be effectively dissipated, whereby cracks may be generated in the connection region 20. Further, although the enlarged portion 10 of the sipe 4 has a circular, flask-like configuration in a section in the tire circumferential direction in all of the related drawings, the shape of the enlarged portion 10 is not limited to the illustrated example and may take on other shapes such as an ellipsoidal one. However, if the enlarged portion 10 has a sectional shape having a corner portion(s), the rib-like land portion 3 may deform when the tire is rotated with a load exerted thereon, followed by generation of cracks in the enlarged portion 10. In order to prevent such a situation from occurring, such a corner portion as described above preferably has a curvature.

EXAMPLES

Next, there were produced pneumatic tires having the same structure as the pneumatic tire of the present invention, except that the configuration of the groove bottom of the sipe is beyond the scope of the present invention (the Comparative example tire), and pneumatic tires according to the present invention (Example tires 1 to 3), as test tires (pneumatic tires for heavy load having tire size of 11R/22.5), respectively, and performances thereof were evaluated as described below.

Figure 16:
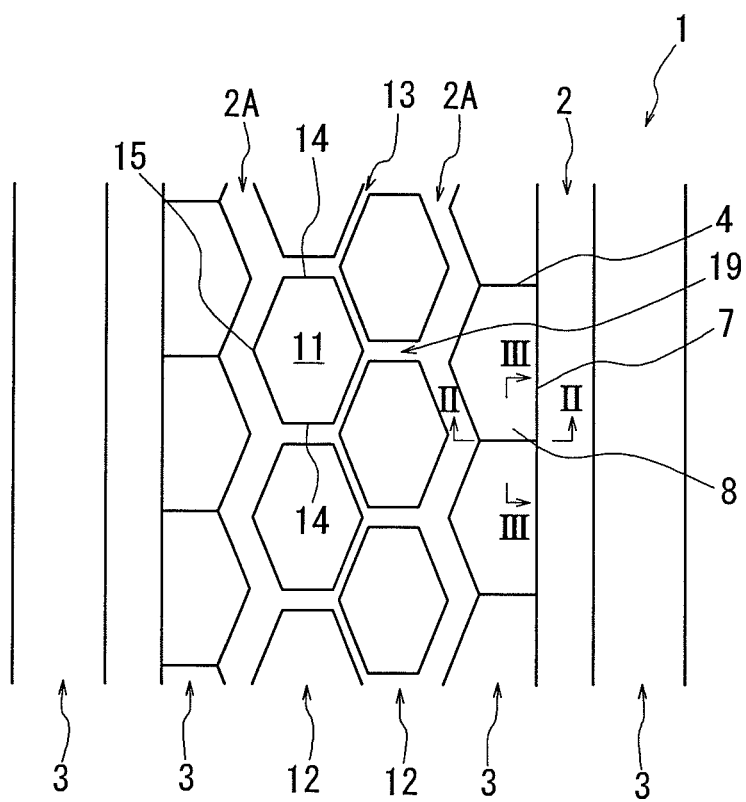
FIG. 16 is a development view of a part of a tread portion of a tire for use in embodiments of the present invention.
Figure 17:
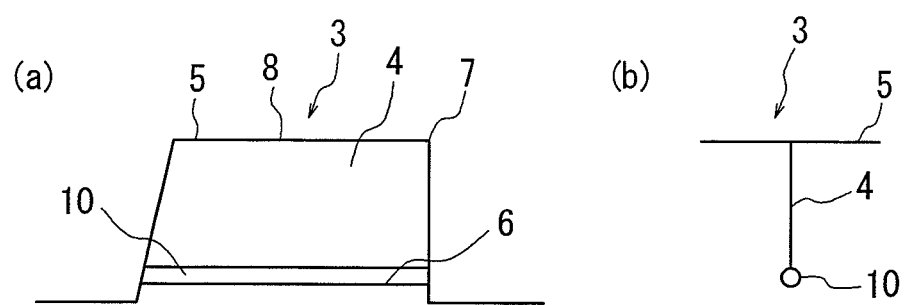
FIG. 17($a$) is a section in the tire widthwise direction (cut along the line II-II of FIG. 16) of a rib-like land portion of a Comparative Example tire.
Figure 18:
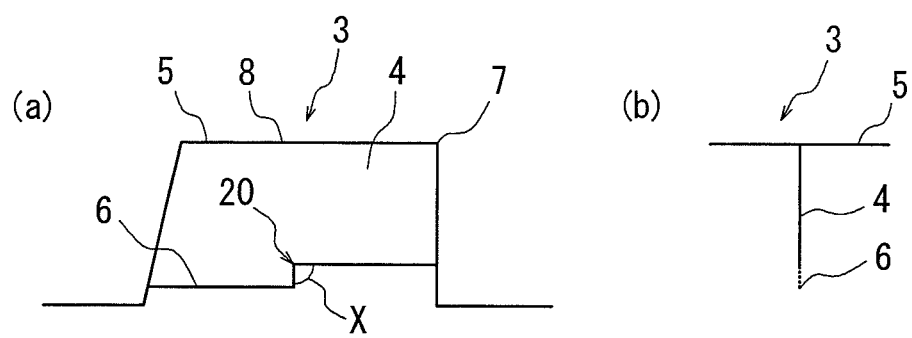
FIG. 18($a$) is a section in the tire widthwise direction (cut along the line II-II of FIG. 16) of a rib-like land portion of a tire of Example 1.
Figure 19:
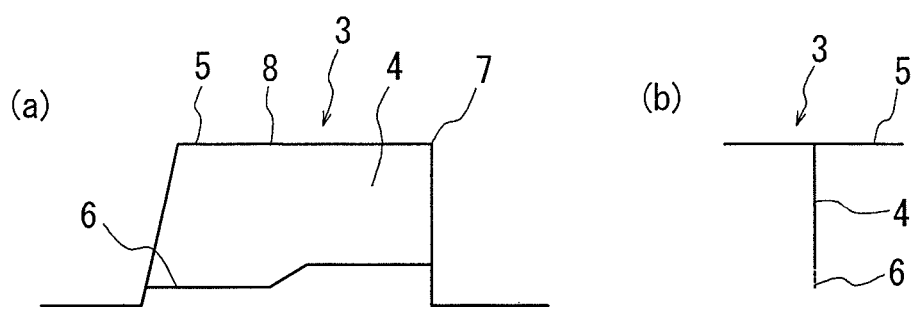
FIG. 19($a$) is a section in the tire widthwise direction (cut along the line II-II of FIG. 16) of a rib-like land portion of a tire of Example 2.
Figure 20:
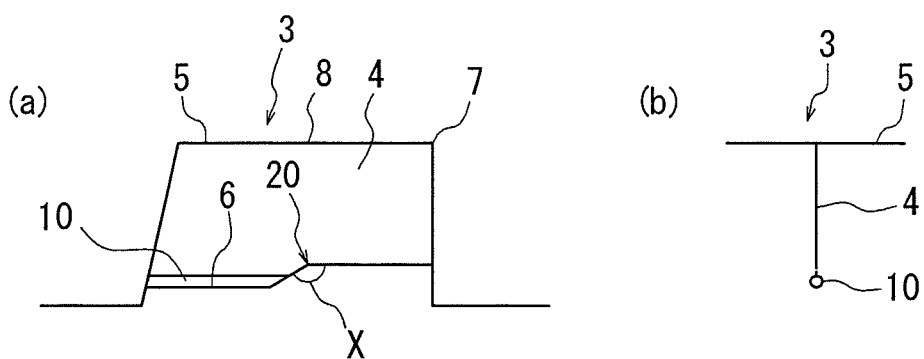
FIG. 20($a$) is a section in the tire widthwise direction (cut along the line II-II of FIG. 16) of a rib-like land portion of a tire of Example 3.

Each of Comparative tire and Example tires 1 to 3 has a tread portion having the structure as shown in FIG. 16. The tread portion has plural rib-like land portions and plural rows of block land portions surrounded by the rib-like land portions. In such rows of the block land portions, the extending direction of the groove portion between the block land portions adjacent to each other in the tire widthwise direction is inclined with respect to the tire widthwise direction and tire circumferential direction; and a distance between the block land portions adjacent to each other in the tire widthwise direction is shorter than a distance between the block land portions adjacent to each other in the tire circumferential direction. Further, the sipes provided in the rib-like land portions of Comparative Example tire and Example tires 1 to 3 have the configurations corresponding to FIGS. 17(*a*), 17(*b*), 18(*a*), 18(*b*), 19(*a*), 19(*b*), 20(*a*) and 20(*b*), respectively. In the Comparative Example tire, the sipe thereof has a length in the tire circumferential direction of 0.7 mm, a length in the widthwise direction of 20 mm, a depth of 16 mm, and an enlarged portion having a flask-like shape provided at the groove bottom, of 2 mm diameter. The sipe of Example 1 tire has a length in the tire circumferential direction of 0.7 mm, a length in the widthwise direction of 20 mm, the maximum groove depth of 16 mm and the minimum groove depth of 13 mm. In the sipe of Example 1 tire, the region having the maximum groove depth is located on the tire equatorial plane side, the region having the minimum groove depth is located on the shoulder side, and an inclination angle X formed by the connection region between the region having the maximum groove depth and the region having the minimum groove depth, with respect to the tire widthwise direction, is 90°. The sipe of Example 2 tire has a length in the tire circumferential direction of 0.7 mm, a length in the widthwise direction of 20 mm, the maximum groove depth of 16 mm and the minimum groove depth of 13 mm. In the sipe of Example 2 tire, the region having the maximum groove depth is located on the tire equatorial plane side, the region having the minimum groove depth is located on the shoulder side, and an inclination angle formed by the connection region between the region having the maximum groove depth and the region having the minimum groove depth, with respect to the tire widthwise direction, is 150°. The sipe of Example 3 tire has a length in the tire circumferential direction of 0.7 mm, a length in the widthwise direction of 20 mm, the maximum groove depth of 16 mm and the minimum groove depth of 13 mm. In the sipe of Example 3 tire, the region having the maximum groove depth is located on the tire equatorial plane side, the region having the minimum groove depth is located on the shoulder side, an inclination angle formed by the connection region between the region having the maximum groove depth and the region having the minimum groove depth, with respect to the tire widthwise direction, is 150°, and an enlarged portion having a flask-like shape of 2 mm diameter is provided at the groove bottom.

The traction performance on a wet road surface was evaluated by: assembling each of the test tires with a rim having size of 7.5×22.5 to obtain a tire wheel; mounting, as a driving wheel, each tire wheel thus obtained to a tractor vehicle for use in the tests; applying an air pressure of 900 kPa (relative pressure) and a load of 8.34 kN (per tire) to each tire; conducting a start acceleration test in a test course paved with iron plates under a wet road surface condition of 2 mm water film, to measure time required for the vehicle to run a predetermined distance; using the time required by the Comparative Example tire as the reference value and expressing the time of other tires as relative values thereto, and comparing the results thus obtained. The larger value of the fraction performance represents the better fraction performance on a wet road surface. The results are shown in Table 1.

Resistance to uneven wear was evaluated by: making the vehicle run on a test road until the wear rate at the rib-like land portion reached 70%; and visually observing whether or not uneven wear due to river wear had occurred therein. The results are shown in Table 1. It was also visually observed whether or not a crack had been generated at the groove bottom of the sipe. The results of the crack observation are also shown in Table 1.

TABLE 1

| | Traction performance on a wet road surface | Uneven wear due to river wear | Cracks at groove bottom of sipe | Total evaluation |
|---|---|---|---|---|
| Comparative Example Tire | 100 | Occurred | Not occurred | B |
| Example 1 tire | 95 | Not occurred | Occurred (minor extent) | A |
| Example 2 tire | 96 | Not occurred | Occurred (very minor extent) | A+ |
| Example 3 tire | 100 | Not occurred | Not occurred | A++ |

As is obvious from the results shown in Table 1, uneven wear due to river wear is suppressed in the tires of Examples 1 to 3, as compared with Comparative Example tire. Further, in the tires of Examples 1 to 3, traction performance on a wet road surface is effectively maintained. In Example 3 tire, in particular, fraction performance on a wet road surface is improved, as compared with the tires of Examples 1 and 2. It is assumed that the fraction performance on a wet road surface in Example 3 tire has improved because block rigidity is lowered therein. Further, in the tires of Examples 1 to 3, generation of cracks at the groove bottom of the sipe is also effectively suppressed.

INDUSTRIAL APPLICABILITY

As is obvious from the foregoing descriptions, according to the present invention, it is possible to provide a tire having a rib-like land portion and sipes provided therein, in which wear resistance has been enhanced by optimizing the shape of the sipes, while good traction performance on a wet road surface is maintained.

REFERENCE NUMERALS

1 Tread portion
2, 2A Circumferential groove
3 Rib-like land portion
4 Sipe
5 Ground contact surface of tread portion
6 Groove bottom of sipe
7 Edge portion on the outer side in the tire widthwise direction of rib-like land portion
8 Center portion of rib-like land portion
9 Portion having the maximum groove depth
10 Enlarged portion
11 Block land portion
12 Rows of block land portion
13 Groove portion between block land portions adjacent to each other in the tire widthwise direction
14 Edge portion in the tire circumferential direction of block land portion
15 Center portion of block land portion
16 Trailing edge
17 Leading edge
18 Shallow groove
19 Lateral groove
20 Connection region

The invention claimed is:

1. A tire having, in a tread portion, at least one row of rib-like land portion and sipes provided in the rib-like land portion, the sipes extending in a straight line and substantially parallel to a tire widthwise direction, characterized in that:
said sipes each having a first portion and a second portion, the first portion being disposed at a shoulder side of said of said land portion and having a smaller depth than the second portion,
wherein the groove bottom of the sipe is provided with an enlarged portion having a length in the tire circumferential direction longer than the opening width of the sipe at a ground contact surface of the tread portion,
wherein only a groove bottom portion having the maximum depth of the sipe is provided with the enlarged portion, and
wherein the sipe has a connecting region provided between said first portion and said second portion, and the connecting region comprises a straight or substantially straight line forming an inclination angle with respect to the tire widthwise direction in the range of 110° to 160°.

2. The tire of claim 1, wherein, in the sipe, the minimum depth of the sipe is in the range of 0.50 to 0.95 times as much as the maximum depth thereof.

3. The tire of claim 1, wherein the length in the tire widthwise direction of a portion having the maximum depth of the sipe is in the range of 0.1 to 0.9 times as long as the length in the tire widthwise direction of the rib-like land portion.

4. The tire of claim 1, wherein the length in the tire widthwise direction of the sipe is at least 0.80 times as long as the length in the tire widthwise direction of the rib-like land portion.

5. The tire of claim 1, wherein the depth of the sipe is in the range of at least 0.30 times as much as the depth of each of circumferential grooves provided at respective sides of the rib-like land portion.

6. The tire of claim 1, wherein:
plural rows of block land portions are formed by demarcation by providing plural lateral grooves for communicating adjacent two circumferential grooves with each other;
in at least two rows of block land portions adjacent to each other with a circumferential groove there between, the block land portions in a first row of block land portions are disposed to be offset with respect to the block land portions in a second row of block land portions in the tire circumferential direction;
the extending direction of the groove portion between the block land portions adjacent to each other in the tire widthwise direction is inclined with respect to the tire widthwise direction and tire circumferential direction; and a distance between the block land portions adjacent to each other in the tire widthwise direction is shorter than a distance between the block land portions adjacent to each other in the tire circumferential direction.

7. The tire of claim 6, wherein a length of each block land portion in a section in the tire widthwise direction thereof increases from the respective ends in the tire circumferential direction of the block land portion toward the center portion thereof.

8. The tire of claim 6, wherein the ratio of a distance between block land portions adjacent to each other in the tire circumferential direction with respect to a distance between block land portions adjacent to each other in the tire widthwise direction is in the range of 1:0.85 to 1:0.3.

9. The tire of claim 6, wherein the ratio of a distance between block land portions adjacent to each other in the tire circumferential direction with respect to the length in the tire circumferential direction of a block land portion is in the range of 0.25:1 to 0.05:1.

* * * * *